(12) United States Patent
Kazi et al.

(10) Patent No.: US 7,525,274 B2
(45) Date of Patent: Apr. 28, 2009

(54) METHOD AND DEVICE FOR CONTROLLING A PLURALITY OF MANIPULATORS

(75) Inventors: Arif Kazi, Augsburg (DE); Jens Bunsendal, Augsburg (DE); Gerhard Hietmann, Herbertshofen (DE); Carsten Spieβ, Augsburg (DE)

(73) Assignee: KUKA Roboter GmbH, Augsburg (DE)

( * ) Notice: Subject to any disclaimer, the term of this patent is extended or adjusted under 35 U.S.C. 154(b) by 840 days.

(21) Appl. No.: 10/809,760

(22) Filed: Mar. 25, 2004

(65) Prior Publication Data

US 2005/0004707 A1 Jan. 6, 2005

(30) Foreign Application Priority Data

Mar. 28, 2003 (DE) ............... 103 14 025

(51) Int. Cl.
*G05B 19/19* (2006.01)
*B25J 9/06* (2006.01)

(52) U.S. Cl. ............... 318/568.1; 318/568.11; 318/567; 318/587; 901/2; 901/19; 700/245; 700/247; 700/255; 700/264

(58) Field of Classification Search ........... 700/169, 700/248, 264, 247
See application file for complete search history.

(56) References Cited

U.S. PATENT DOCUMENTS

| 5,978,578 | A | 11/1999 | Azarya et al. | |
|---|---|---|---|---|
| 6,175,206 | B1* | 1/2001 | Ueno et al. | 318/568.1 |
| 6,208,104 | B1* | 3/2001 | Onoue et al. | 318/568.11 |
| 6,697,681 | B1* | 2/2004 | Stoddard et al. | 700/17 |
| 6,922,611 | B2* | 7/2005 | Lapham | 700/245 |
| 7,010,365 | B2* | 3/2006 | Maymudes | 700/65 |
| 2001/0035729 | A1 | 11/2001 | Graiger et al. | |
| 2002/0064157 | A1 | 5/2002 | Krause | |
| 2003/0023333 | A1 | 1/2003 | Birkle | |
| 2004/0105398 | A1* | 6/2004 | Franke et al. | 370/299 |
| 2006/0184272 | A1* | 8/2006 | Okazaki et al. | 700/245 |

FOREIGN PATENT DOCUMENTS

| DE | 92 13 146.8 | 4/1993 |
|---|---|---|
| DE | 197 18 284 | 9/2001 |
| DE | 100 55 025 | 5/2002 |

(Continued)

OTHER PUBLICATIONS

Microspft Press Computer Dictionary, 3rd Edition, 1997, pp. 221-222, 245, and 367.*

(Continued)

*Primary Examiner*—Thomas G Black
*Assistant Examiner*—Lin B Olsen
(74) *Attorney, Agent, or Firm*—McGlew and Tuttle, P.C.

(57) ABSTRACT

A method and a system for controlling a plurality of manipulators with a large number of control units associated with the manipulators in such a way that each control unit controls at least one manipulator, are characterized in that an operating device accesses several control units for controlling the manipulators. Thus, it is possible according to the invention to operate even very closely juxtaposed manipulators without any crossing and interlacing of the connecting channels between the operating devices and control units which would prevent a reliable association in operation. The invention also makes it possible for only one operator to operate cooperating robots.

40 Claims, 12 Drawing Sheets

FOREIGN PATENT DOCUMENTS

| | | |
|---|---|---|
| DE | 100 58 524 A1 | 6/2002 |
| DE | 101 47 432 | 10/2002 |
| EP | 0942343 A2 * | 9/1999 |
| EP | 1 388 396 A | 2/2004 |
| WO | WO 01/67190 | 9/2001 |
| WO | WO 01/71878 A | 9/2001 |

OTHER PUBLICATIONS

"Analysis of Open CNC Architecture for Machine Tools", O.L. Asato, E.R.R.Kato, R.Y.Inamasu, and A.J.V.Porto, Presented at COBEM 99, J. of Braz. Soc. of Mechanical Sciences, Jul. 202, pp. 208-212.*

* cited by examiner

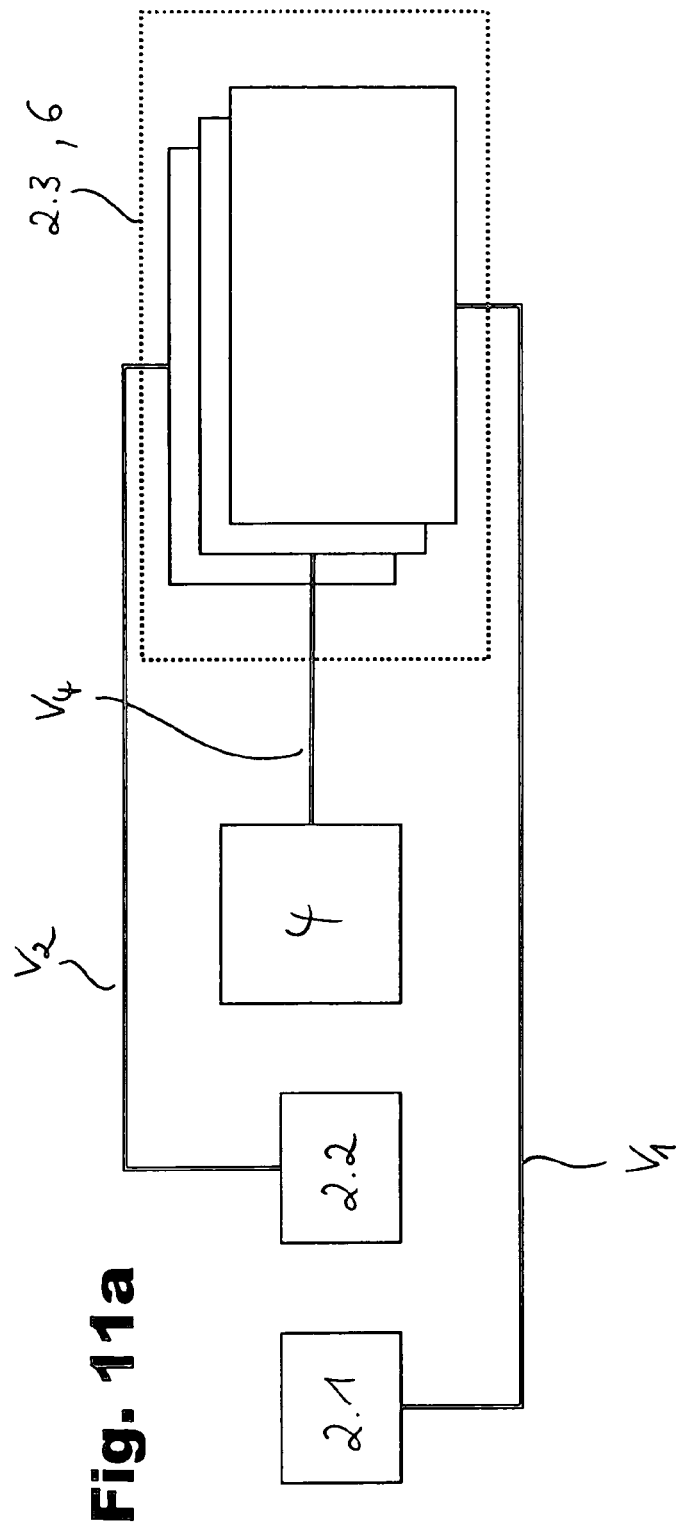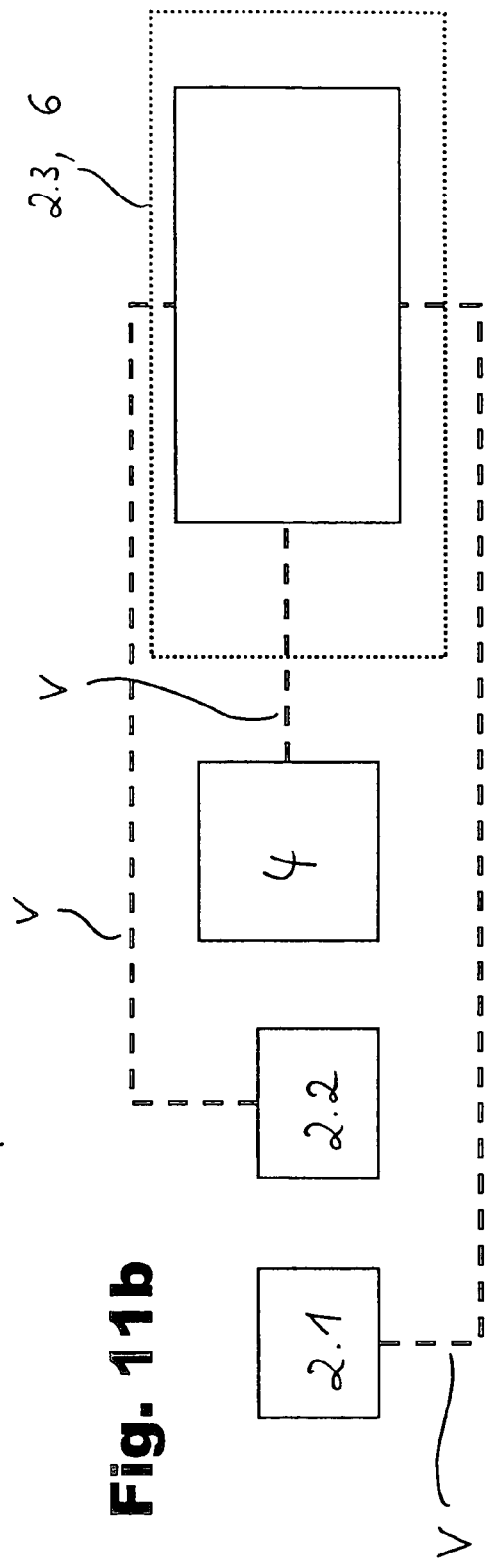

METHOD AND DEVICE FOR CONTROLLING A PLURALITY OF MANIPULATORS

FIELD OF THE INVENTION

The invention relates to a method and to a device for controlling a plurality of manipulators having a plurality of control units associated with said manipulators, so that each control unit controls at least one manipulator.

BACKGROUND OF THE INVENTION

For the manual movement of manipulators such as industrial robots, e.g. within the framework of robot teaching processes, or when modifying software-supported control programs on control units associated with the manipulators, nowadays use is generally made of portable and therefore flexibly usable operating equipment. The latter generally has operating and input elements such as control levers or keys and possibly also indicating or display elements and are connected by means of cables or through wireless communication to a robot control unit.

Such an operating device is required for each control unit, so that generally an individual operating device is used for each manipulator, because each manipulator also has its own control. Alternatively, it is known to provide a common control for several manipulators, when only a common operating device is connected to the control.

In the first mentioned alternative, it has proved disadvantageous when using a cable connection between the operating device and the control unit that due to the large number of operating devices used, there is a crossing and interlacing of cables and consequently it is not readily possible for operating personnel to reliably associate the operating devices and manipulators, particularly if the latter are closely juxtaposed, as is the case in the car industry.

For safety reasons the operating devices for manipulators, such as industrial robots, regularly have a consent or permission switch, which must be depressed in test operation in order to be able to move the particular robot. In applications where several manipulators cooperate with one another, it has proved disadvantageous that then the permission switch must be simultaneously depressed on several operating devices, so that such an operation of cooperating robots is only possible when there are several operators.

The aforementioned disadvantages are avoided in known control systems, where a plurality of robots is connected to a common control. However, then the number of operable robots is limited by the capacities of the individual control units. If the number of manipulators exceeds the number of manipulators connectable to a control, it is no longer possible to move all the manipulators in a coordinated manner, which considerably limits the flexibility of such systems in use.

The problem of the invention is, whilst avoiding the aforementioned disadvantages of the prior art, to provide a method and a system for controlling a plurality of manipulators, which permits an operation of a random number of manipulators, said number being independent of the capacities of the individual control units and at the same time a coordinated movement of several manipulators is to be made possible, such as a planned influencing of individual manipulators.

SUMMARY OF THE INVENTION

In a method of the aforementioned type, the set problem is solved in that a single operating device accesses several control units. In a device of the aforementioned type the set problem is solved by a common operating device connectable to at least one specific control unit for the operation of the manipulators.

The invention ensures a flexible control or operation of the manipulators. During the method according to the invention or within the scope of the device according to the invention, in the case of several control units, it is possible e.g. during test operation for an operator to influence directly movements of one or more manipulators by means of one operating device. According to a further development of the inventive method, on the operating device for a movement control of the particular manipulators are generated in a direct manner suitable control signals (movement-relevant signals).

According to a further development of the inventive device, the control units are in each case subdivided into areas set up for a real time and a non-real time operating system and preferably the real time areas of the control units are constructed for the processing of control signals (movement-relevant control signals) directly suitable for a movement control of the particular manipulators. In this connection, according to a further development of the inventive method, the movement-relevant control signals are directed via a first transmission device to an area of the associated control unit, which is constructed for a real time processing of movement-relevant control signals.

Additionally according to a further development of the inventive device, the non-real time areas of the control units are connected by means of a second transmission device. In order to be able to control a plurality of manipulators with a single common operating device, according to a further development a control unit, with which the operating device can be physically or logically connected, has in its non-real time area a terminal device for displaying operating surfaces of different control units. In a preferred further development, said control unit also has a detecting device for detecting the control unit controlling the selected manipulators. According to a preferred development, the inventive device also incorporates a path control device on which it is possible to act through the detecting device, so that the movement-relevant control signals can be directed by means of the first transmission device to the control unit associated with the selected manipulators. It is possible in this way to direct in targeted manner the control signals triggered by the common operating device to specific control units. In parallel to a transmission to the associated control unit, in the control unit having the detecting device, according to the invention, there is preferably a directing of the control signals to the terminal device.

According to a further development of the inventive method, further not directly movement-relevant control signals generated by the operating device are exclusively directed to the terminal device. In the framework of the device according to the invention, it is also possible for all the control signals between the terminal device and an area of the associated control unit constructed for the processing of data in non-real time, such as an operating surface, to be communicatable by means of the second transmitting device.

To enable an operator to directly control the manipulator to be operated, according to the method of the invention the operating device displays the operating surface of the control unit of the selected manipulator, the display preferably taking place graphically and the image information being transmitted in standard pixel data form. In order to transmit image information of the control unit associated with the selected manipulator to the operating device in as efficient a manner as possible, according to further developments of the inventive method, image information data are digitally transmitted to the controls and such data are compressed prior to transmission. Preferably standard image data are transmitted not in pixel form, but merely as control instructions and are independently graphically displayed by the operating device.

To be able to stop the robot in the case of a loss of connection between the operating device and the manipulator or the associated control unit, according to a preferred development of the inventive method, the transmission of movement-relevant signals via the first transmitting device is controlled by a first monitoring device and in the case of a transmission interruption the monitoring device generates a movement-relevant, e.g. a movement-preventing control signal. Said control signal can be subsequently used for stopping the particular manipulator.

It must also be prevented that the image data displayed on the operating device come from a first manipulator or its control, whereas the generated control signals are transmitted to another robot control. In order to ensure this, in a preferred development of the inventive device, display and control signals between the control units and the operating device can be transmitted on a common data channel.

Alternatively, in the inventive method, image data and control signals generated by the operating device are transmitted on different channels, but the function and target of the channels are controlled by a second opposite monitoring device, which is constructed for monitoring a function of a target of the data channels, so that it can be ensured that both channels are functioning and end at the same control unit.

To allow a single operator to operate several manipulators with a single operating device, according to a particularly preferred development of the inventive device, there is a unigue association of the displayed operating surface and the selected manipulators. For this purpose the operating surface and the corresponding manipulator can have substantially identical, optically active markings. Within the scope of a further development of the inventive device, the manipulators in each case have optical and/or acoustic signal generators, which are in each case constructed for emitting a signal at or during a selection of the particular manipulator. Then, in conjunction with the inventive method, for identifying the selected manipulator an optically active marking present on the given manipulator is displayed on the operating device or an acoustic and/or optical signal generator present on the particular manipulator is activated. In an alternative development of the inventive method, for identifying the selected manipulator a designation of the manipulator, such as a name is displayed on the operating device.

In order to make clearly detectable the choice of a manipulator made by an operator on the operating device, on the manipulators or on the operating device are provided optical and/or acoustic signal generators, so that the manipulator linked with the operating device is indicated by an optical and/or acoustic signal generator.

In order to permit the simultaneous movement of a plurality of robots when using the inventive control system, the corresponding control information such as the depression of a permission key, operating mode, pending emergency stop, etc. must be simultaneously transmitted to all the manipulators. Thus, according to a further development of the invention, the control units of all the manipulators are interconnected by a safety transmitting device.

BRIEF DESCRIPTION OF THE DRAWINGS

Further characteristics and advantages of the invention can be gathered from the attached claims and the following description of embodiments relative to the drawings, wherein show:

FIGS. 11a, 11b Diagrammatic representations relative to the visualization of remote devices used during the inventive method.

DETAILED DESCRIPTION OF THE DRAWINGS

Figure 1:
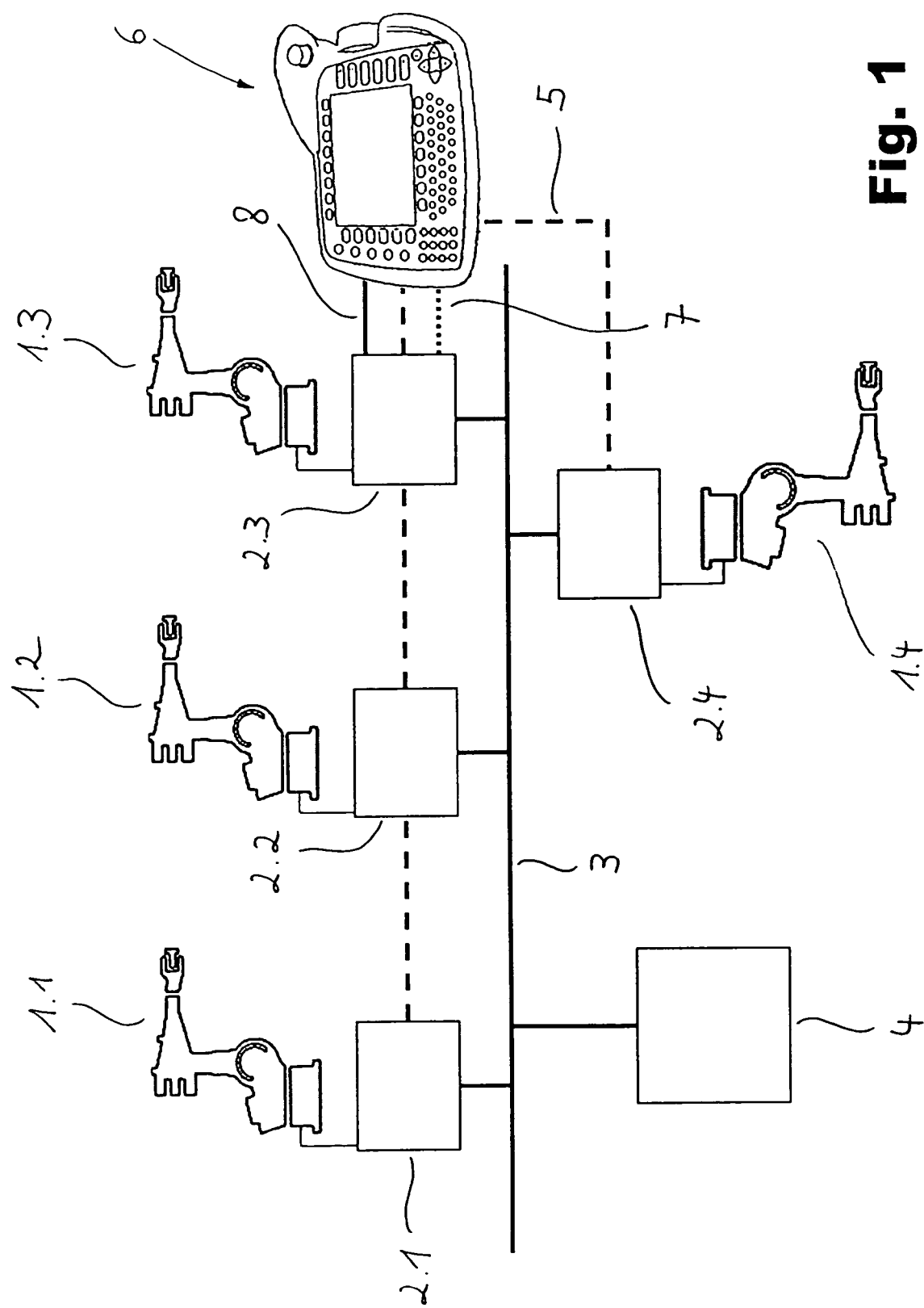
FIG. 1 A diagrammatic overall view of an inventive device with a first connection possibility for a common operating device.

FIG. 1 shows a plurality of manipulators, such as industrial robots 1.1-1.4, which are in each case connected to an associated control unit 2.1-2.4 for controlling the particular robot. The control units 2.1-2.4 are interconnected by means of a real time data bus 3, e.g. Ethernet, Firewire, etc. for the planned addressing of each unit. In the embodiment shown a stationary monitoring device 4, e.g. a control station or computer for (remote) maintenance purposes is also connected to the data bus.

The control units 2.1-2.4 are also connected by means of an additional safety bus 5 by means of which safety-relevant signals can be simultaneously supplied to all the connected devices 2.1-2.4.

FIG. 1 also shows a common operating device 6, which is connected to a random one of the control units, here unit 2.3. Control unit 2.3 serves as a connection point, i.e. it makes available the supply voltage, the data connection, the image generation and the access to the safety bus 5 by means of which the operating device 6 is connected to all the control units 2.1-2.4. By means of the safety bus 5 specific settings on the operating device 6, such as operating mode, emergency stop, permission, drives on-off, act simultaneously on all the further connected control units 2.1-2.4 or manipulators 1.1-1.4. The operating device 6 is also connected by means of a data bus 7 and a visualizing bus 8 to the control unit 2.3.

Figure 2:
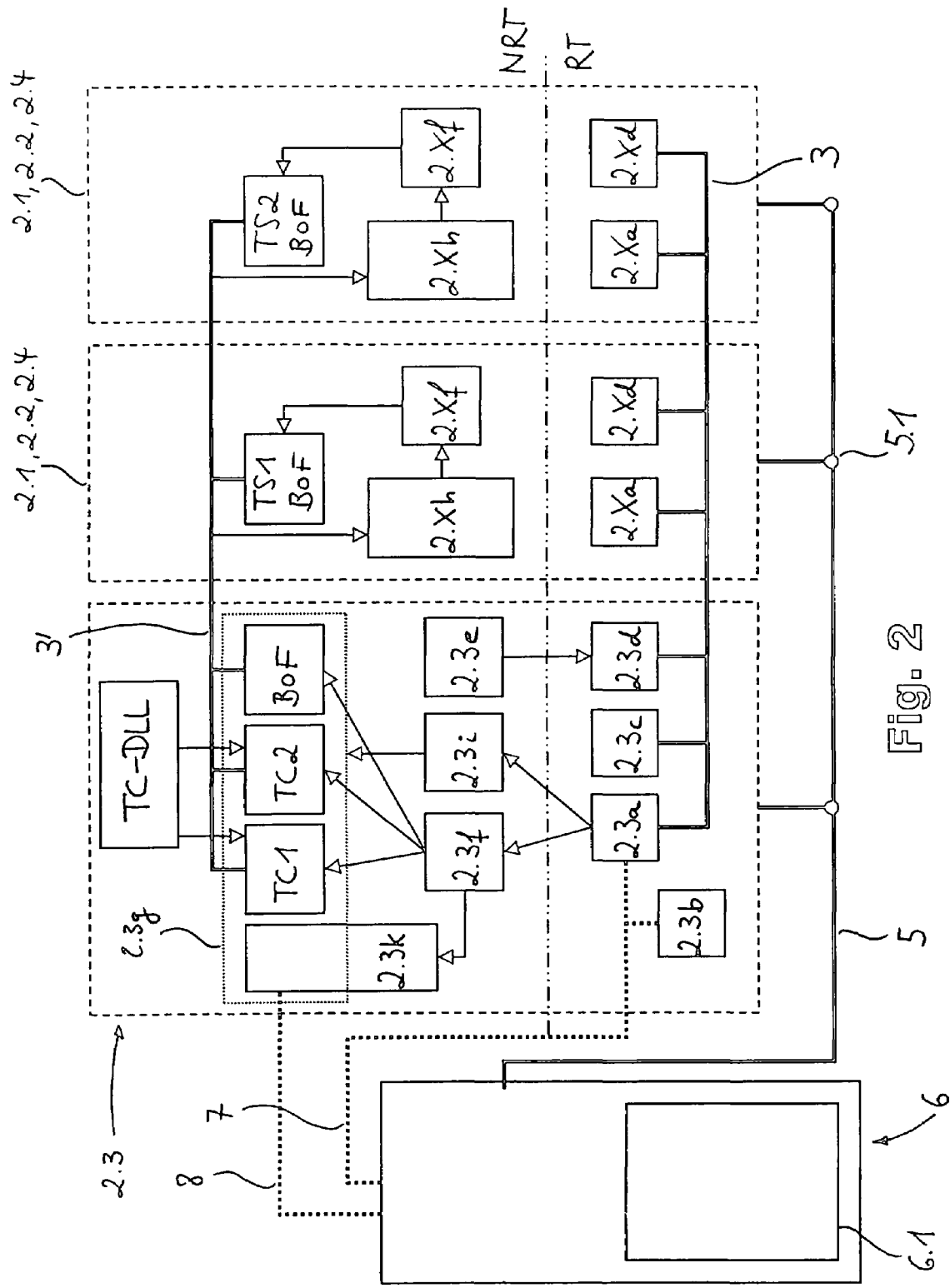
FIG. 2 A block diagram showing the architecture of an inventive device according to FIG. 1.

By means of the data bus 7 inputs, e.g. key depressions of the operator of the operating device 6 are transmitted in real time to the control unit 2.3. There is a simultaneous securing of communication by a monitoring device (Watchdog; FIG. 2):. If the control unit 2.3 or operating device 6 are no longer transmitting data, either the operating device 6 or the control unit 2.3 by means of the safety bus 5 trigger a movement stop for the connected control units 2.1-2.4 or the manipulators 1.1-1.4.

The control unit 2.3 receives the control signals generated at the operating device 6 and evaluates them in real time.

Movement-relevant and therefore time-critical control signals such as start, stop or manual movement keys are processed with a higher priority than general, not directly movement-relevant control signals or operating keys in order to ensure a rapid reaction of the manipulators 1.1-1.4. Time-critical signals arise, e.g. on operating special movement keys on the operating device, so that movement-relevant control signals are generated. On releasing such a movement key, there is immediately a stoppage of the particular manipulator 1.1-1.4. However, visualization data are not time-critical. If the image or picture composition on the operating device 6 to some extent takes place with a time delay, this has no negative effects with regards to manipulator operation.

The control unit 2.3 also provides a connection between the operating device 6 and data bus 3. Inputs at the operating device 6 are directed in targeted manner from the control unit 2.3 to another control unit 2.1, 2.2, 2.4 associated with a manipulator 1.1-1.4 to be operated. Higher priority, movement-relevant control signals are transmitted with an individual transmission protocol, so as on the one hand to guarantee the real time nature of the transmission and on the other to ensure that a monitoring device 4 cannot move a manipulator 1.1-1.4. The connections between the control units via the data bus 3 are also secured by a monitoring device (Watchdog; FIG. 2).

Lower priority control signals, e.g. normal keys such as letters and numbers, are transmitted by means of a standard protocol, e.g. RDP (Remote Desktop). This guarantees that a monitoring device 4 can be used in order to perform operating actions on the control units 2.1-2.4, e.g. in order to program or configure the same. In this case a movement of the manipulators 1.1-1.4 is impossible.

In order to be able to also operate a "remote" control unit 2.1, 2.2, 2.4 to which the operating device 6 is not connected by means of the latter, which is the aim and purpose of the present invention, the operating device 6 must also be able to display the remote operating surface BOF of the remote control unit. This is implemented by control unit 2.3, i.e. the particular control unit to which the operating device 6 is connected (cf. FIG. 2). All the connected control units 2.1-2.4 make available to the data bus 3 the display of their operating surface BOF by means of a standardized protocol such as RDP. By means of the data bus 3, the control unit 2.3 recalls the corresponding data, particularly image data, converts the same and directs them via the visualizing bus 8 to the operating device 6. Through the use of a standard format such as RDP, it is also possible for the monitoring device 4 to access the operating surface BOF of the individual control units 2.1-2.4.

The visualization data to be transmitted to the operating device 6 are low priority signals, in the manner described hereinbefore.

The general inventive concept concerning signal and image data transmission will be explained in greater detail hereinafter relative to FIG. 2.

FIG. 2 shows in broken line form three control units according to FIG. 1. The left-hand control unit 2.3 in FIG. 2 is the control unit to which the common operating device 6 is connected via the data bus 3, whereas the two other control units in each case represent one of the further control units 2.1, 2.2, 2.4 of FIG. 1. In the construction shown in FIG. 2, the common operating device 6 has an input unit 6.1, optionally with a keyboard and further operating, indicating and display elements.

Data bus 3 is used for transmitting higher priority data, e.g. movement-relevant control signals, whilst an additional bus 3' ensures the transmission of lower priority data. As shown in FIG. 2, buses 3 and 3' can be physically separated or, as stated relative to FIG. 1, can be implemented by means of different transmission protocols.

As is also shown in FIG. 2, the control units 2.1-2.4 are subdivided into an area RT (Real Time), which is constructed for implementing real time operating systems such as VxWorks, and a second area NRT (Non Real Time) constructed for implementing a non-real time operating system such as Windows. The control unit 2.3 also has a special driver 2.3a for the common operating device 6. In the same way as the driver 2.3a of control unit 2.3, the further control units 2.1, 2.2, 2.4 have operating device emulators 2.Xa.

In addition, in its RT area, the control unit 2.3 has in conjunction with the data bus 3 a monitoring device 2.3b (Watchdog), a path control device 2.3c and a processing device 2.3d for movement-relevant control signals. In its non-real time area NRT the control unit 2.3 incorporates a detecting device 2.3e, a queue 2.3f for input signals, e.g. keyboard signals, as well as a terminal device 2.3g for displaying its own or remote operating surfaces BOF or TC1, TC2.

The remote control units 2.1, 2.2, 2.4, according to FIG. 2, comprise in their RT area in each case a processing device 2.xd for movement-relevant signals and in the NRT area in each case a queue 2.xf, a reader 2.xh for reading the input signals from the non-real time bus 3' and terminal server programs TS1, TS2 for implementing an operating surface BOF on the corresponding control unit 2.1, 2.2, 2.4.

The control unit 2.3 also comprises a switching device 2.3i, which receives (keyboard) signals from the queue 2.3f and acts on the terminal device 2.3g for the selection of an active display area TC1, TC2, BOF. A selecting device 2.3k is directly connected to a verification device of the operating device 6.

The transmission and processing of real time data, such as movement-relevant control signals, takes place in RT areas of control units 2.1-2.4, whereas in NRT areas there is only a transmission or processing of data requiring no real time treatment, e.g. visualization data.

The driver 2.3a of control unit 2.3 communicates by means of a CAN protocol (Controller Area Network protocol) with the operating device 6. Unlike in the case of known methods or devices, the control signals generated by the operating device 6 e.g. by depressing keys, are not directly directed to the RT area of the control unit 2.3 or control units 2.1-2.4, but instead are, according to the invention, subdivided into three groups:

Signals generated by the operating device 6 are transmitted by driver 2.3a to the queue 2.3f in the NRT area of the control unit 2.3. Thus, in the NRT area the signals are available to all programs, e.g. terminal client programs TC1, TC2. They are used for displaying remote operating surfaces and are consequently as a result of their link with the terminal client DLLs TC-DLL (Dynamic Link Libraries) able to intercept special control signals, e.g. selection signals for specific manipulators and/or control units and transmit them by means of the non-real time bus 3' to the corresponding remote control unit 2.1, 2.2, 2.4. When a terminal client program receives input signals, it transmits them to the corresponding terminal server TS1, TS2 on the corresponding control unit 2.1, 2.2, 2.4 on which runs the corresponding operating surface BOF of the remote control unit 2.1, 2.2, 2.4.

If an operator generates on operating device 6 movement-relevant signals, e.g. by depressing special movement keys, the control unit 2.3 transmits said movement-relevant signals in parallel to the indicated transmission in the NRT area of the control unit 2.3 to the processing device 2.3d, 2.Xd in the RT area of the device, i.e. to the processing device of the selected control. The addressing of the correct processing device 2.3d, 2.Xd takes place by means of the TCP/IP address of the associated control unit 2.1-2.4. Signal processing in the RT area of the device takes place in conventional manner for the movement control of the manipulators 1.1-1.4 (FIG. 1). The transmission to the corresponding operating surface BOF of the control unit 2.3 or units 2.1, 2.2, 2.4 takes place by means of the queue 2.3f or the bus 3' and the corresponding terminal server TS1, TS2.

The processing device 2.3d, 2.xd differentiates between the control unit 2.3 or the remote control units 2.1, 2.2, 2.4. Only in the case when the processing device 2.3d of control unit 2.3 receives a movement-relevant signal, does it direct the same in the above-described manner to the NRT area of the selected control unit. The processing devices 2.xd of the remote control units 2.1, 2.2, 2.4 do not direct the signals to the NRT area of the corresponding control unit 2.1, 2.2, 2.4. This prevents the control unit from receiving the same control signals in two ways, namely via the terminal server and the processing unit, which could lead to control conflicts, i.e. in control units 2.1, 2.2, 2.4 there is no double signal transmission between the RT area and the NRT area of the particular control unit.

Figure 5:
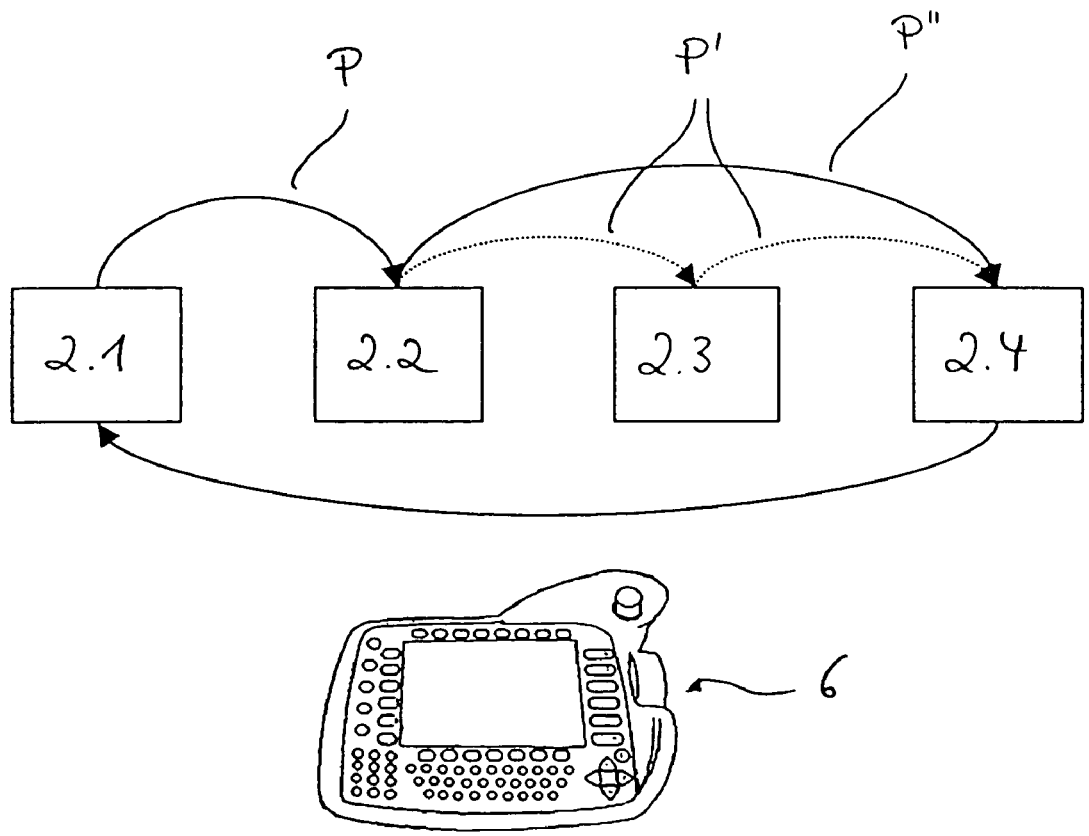
FIG. 5 A diagrammatic representation of a first selection possibility for a specific control unit through a common operating device.
Figure 6:
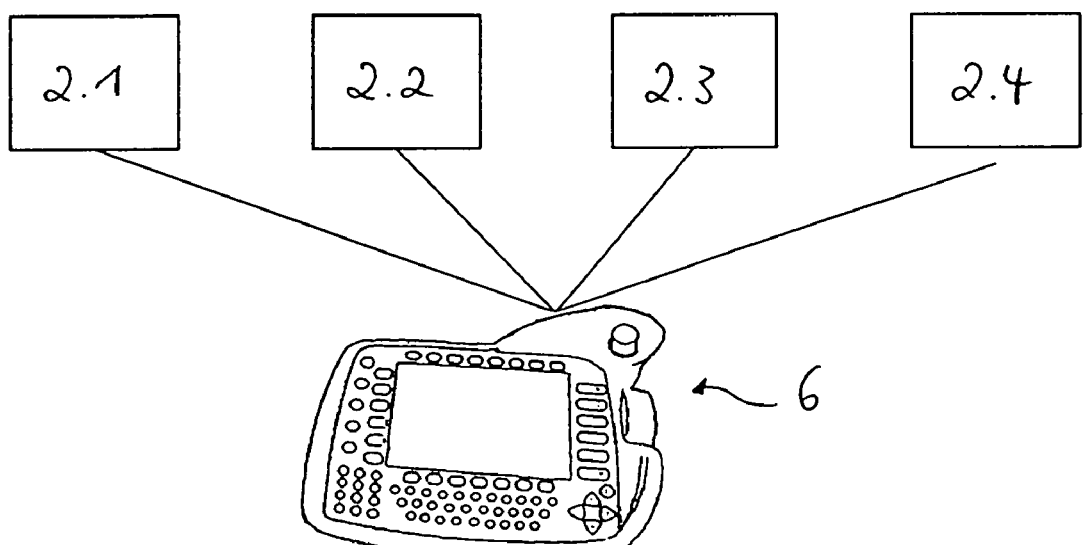
FIG. 6 A diagrammatic representation of a second selection possibility of a specific control unit by a common operating device.

If an operating device 6 generates a selection or switching signal, e.g. by depressing one or more selected keys, the driver 2.3a transmits a signal to the switching device 2.3i. This generally software-constructed device jumps backwards and forwards between the local operating surface BOF of the control 2.3 and optionally further terminal clients TC1, TC2 represented in the terminal device 2.3g and which display the operating surfaces of the other control units 2.1, 2.2, 2.4 (FIGS. 5, 6). If the switching device 2.3i jumps to another terminal client TC1, TC2 or the local operating surface BOF, the corresponding application comes in the focus of the NRT operating system of control unit 2.3. Such a focus shift is detected by the detecting device 2.3e, which informs the driver 2.3a of the focus shift and transmits an IP address of the particular RT area of the associated control unit 2.1-2.4 or the corresponding processing device 2.3d, 2.Xd to the path control device 2.3c. In accordance with the path control device 2.3c, the driver 2.3a "uncouples" from the RT area of the previously active control unit 2.1-2.4 and is transmission-linked with the RT area of the newly selected control unit 2.1-2.4 corresponding to said IP address.

In this way an operator can even use standardized input devices, such as a conventional keyboard or mouse, in order to jump backwards and forwards between the applications, i.e. the terminal clients TC1, TC2 and the local operating surface BOF, without there being any risk of one specific operating surface being displayed, whereas another operating surface or another control unit has been selected: The system is synchronized in accordance with the active window (application program TC1, TC2, BOF in the focus of the NRT operating system of the master control 2.3) and not by means of key depression (signal generation) on operating device 6.

In normal operation each control unit 2.1-2.4 checks whether a common operating device 6 is connected thereto before enabling drive units of an associated manipulator 1.1-1.4 (FIG. 1). As the control units 2.1, 2.2, 2.4 are not directly connected to an operating device 6, it is necessary to eliminate such safety precautions. This function is fulfilled by operating device emulators 2.Xa of control units 2.1, 2.2, 2.4, which determine the presence of a common operating device 6 at control unit 2.3 and transmit corresponding control signals for the elimination of the indicated protective precautions on the control unit 2.1, 2.2, 2.4.

A safety monitoring of the selection of control units or manipulators implemented by the user is performed according to the invention on both a hardware and software basis. The hardware component in particular comprises the safety bus 5.

Figure 3:
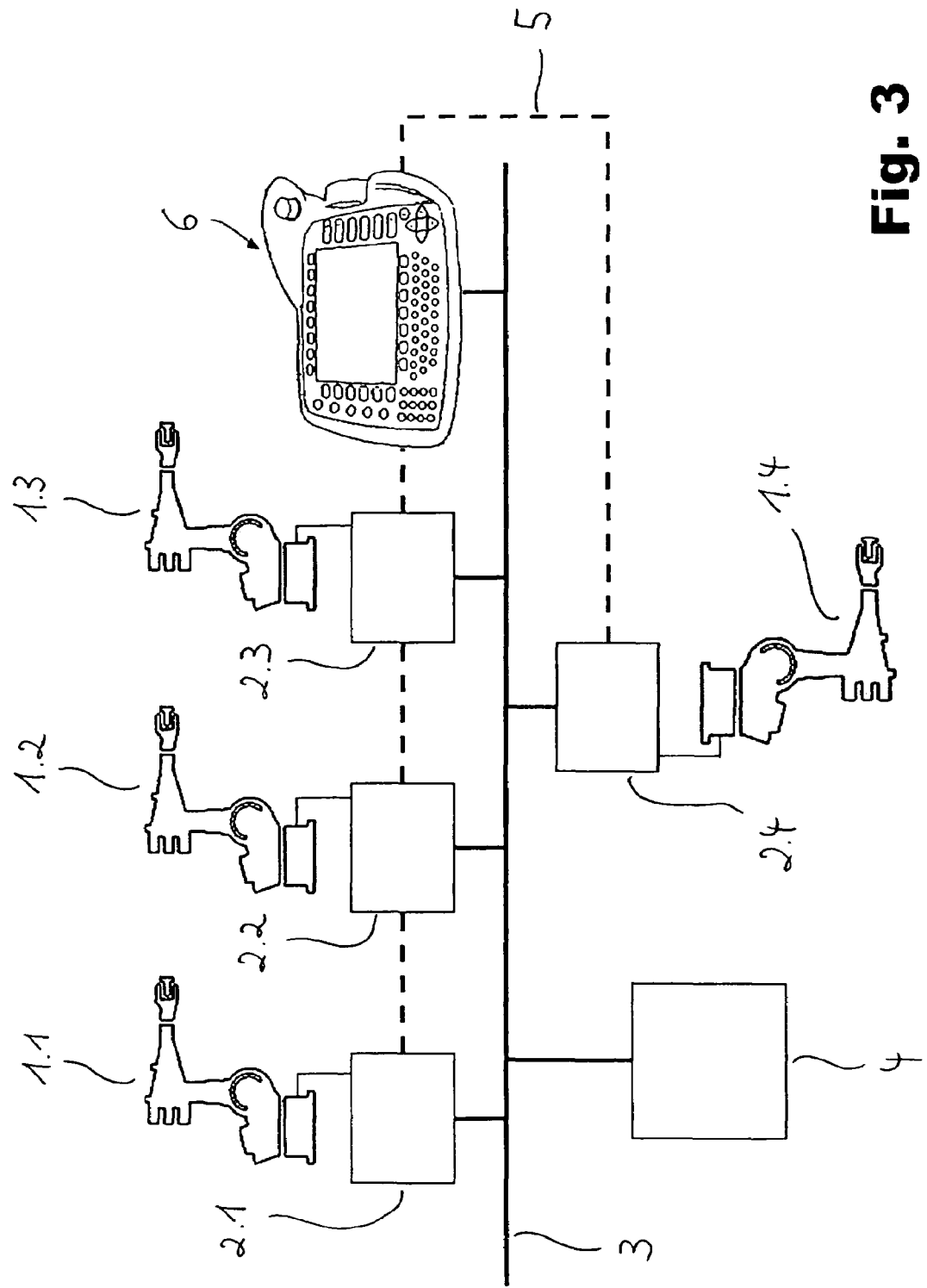
FIG. 3 Another connection possibility for a common operating device to a device according to FIG. 1.

The construction of the inventive system corresponding to FIG. 1 is essentially shown again in FIG. 3 and is provided with manipulators 1.1-1.4 and associated control units, 2.1-2.4, which are linked by means of a data bus 3 and a safety bus 5. Here again a stationary monitoring device 4 is provided on the data bus. Unlike in FIG. 1, in the embodiment of FIG. 3 a common operating device 6 is directly connected to the data bus 3 and safety bus 5. In this case the operating device 6 directly accesses via the bus one of the control units 2.1-2.4. Such a construction presupposes a more complex operating device 6, because the latter must implement the different protocols for the visualization of the terminal device of the master control and for actual operation. In addition, the operating device 6 must independently implement the direct link with the data bus 3.

Figure 4:
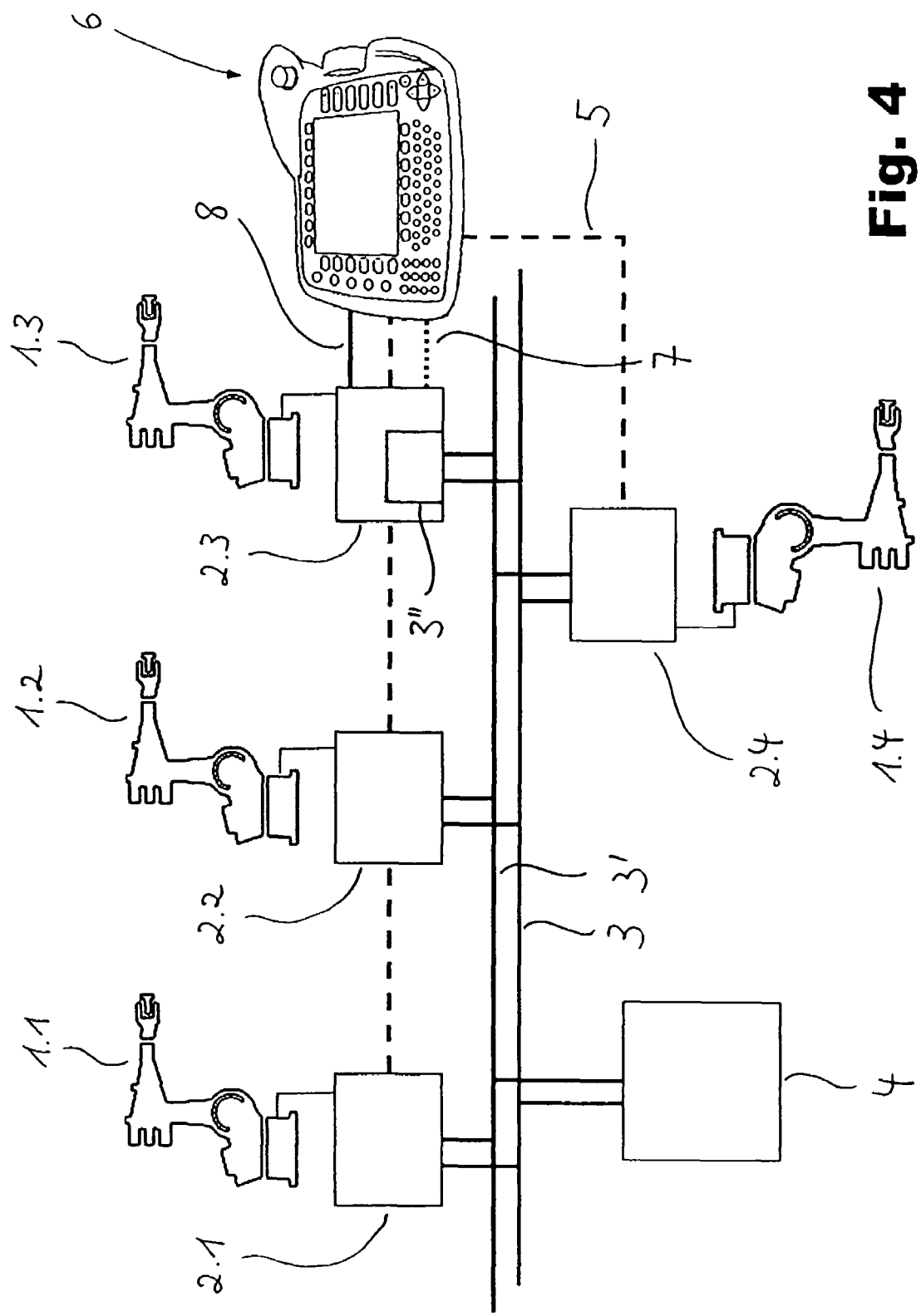
FIG. 4 A representation corresponding to FIG. 1 in the case of a device with separate data channels.

The development of the inventive system shown in FIG. 4 also essentially corresponds to the embodiment of FIG. 1, but the control units 2.1-2.4, much as in FIG. 2, communicate via two physically separate data buses 3, 3', instead of via a common data bus using two different protocols.

The data buses 3, 3' thus separate time-critical, e.g. directly movement-relevant data from physical data of a not time-critical nature and transmit the same on separate channels. The use of two separate data buses 3, 3' consequently avoids the software control of priorities in the case of data traffic via one bus.

FIG. 4 also shows a monitoring device 3" constructed for monitoring the operability and target of the separate data channels to ensure that an operator operates the manipulator whose operating surface he sees.

The basic distinction as to which data are time-critical is either made by the operating device 6 (in the case of a device directly connected to the bus, cf. FIG. 3) or the control unit 2.3 to which the operating device 6 is connected (FIGS. 1, 4).

FIGS. 5 and 6 illustrate the selection of a specific control unit 2.1-2.4 by an operator using the operating device 6. For this purpose the operator depresses on the operating device 6 a special key or key combination, so that a selection signal is generated. According to FIG. 5, this results in operation changing from the present control unit to the next control unit (indicated by arrows P, P' in FIG. 5). The change is tantamount to a focus change in the terminal device 2.3g of control unit 2.3 (cf. FIG. 2). Thus, an operator is very rapidly able to change from one control unit to the next. The change takes place internally by the cyclic processing or running through of lists, so that the switching order is always the same. If one of the control units, such as e.g. unit 2.3 in FIG. 5, is not available, it is skipped during selection (broken lines P') and the operating device by means of the control unit 2.1 directly accesses control unit 2.4 (arrow P"'). Such a change procedure speeds up selection, particularly in smaller installations with few control units.

As an alternative, FIG. 6 shows the selection of control units by planned selection. In this case the operator calls up a dialogue by means of the operating device 6 and in which are listed all available control units. Thus, by planned selection it is possible to jump directly to a specific unit and this is particularly appropriate in larger installations.

Figure 7:
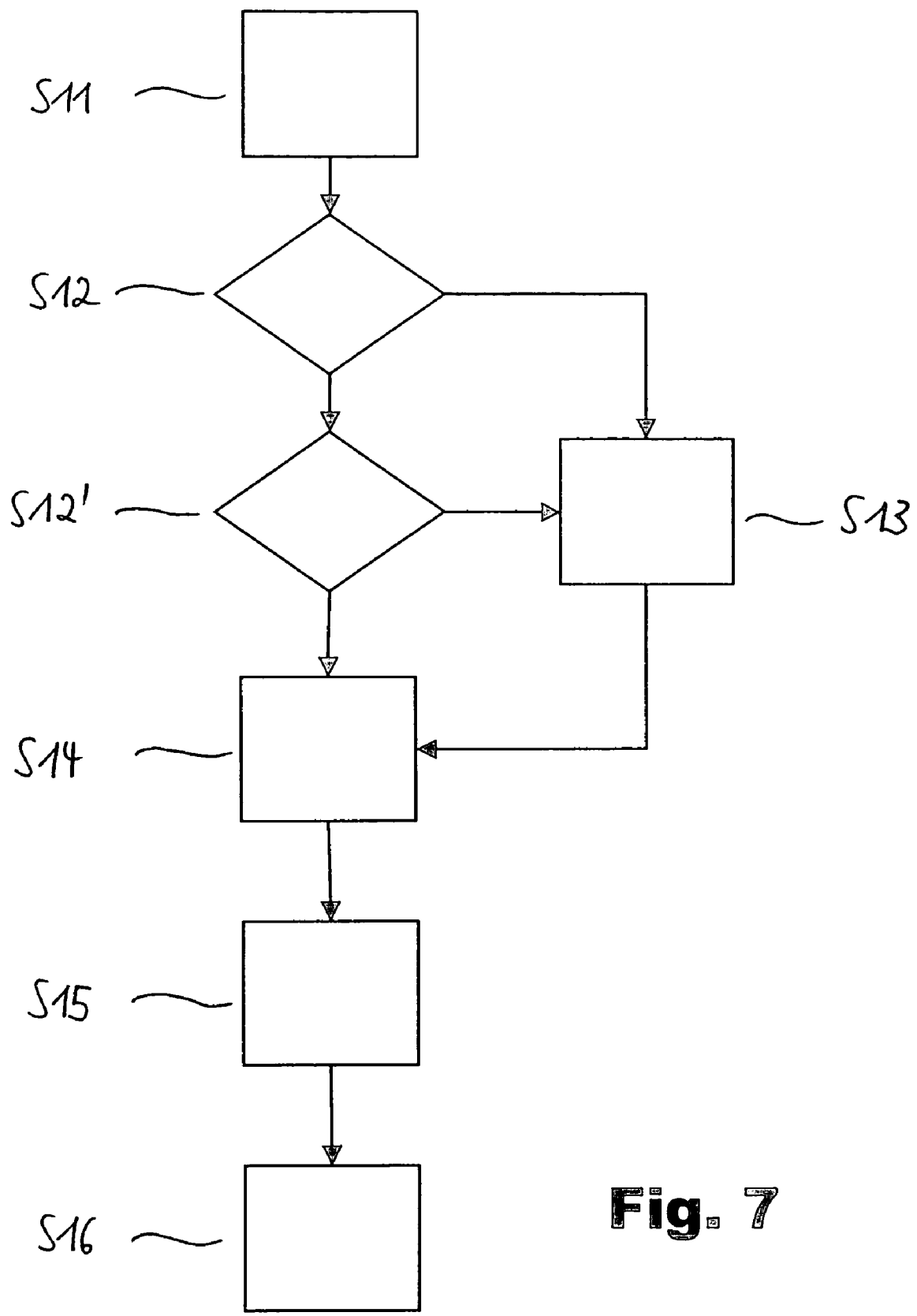
FIG. 7 A flow chart of a switching process between two specific control units.

FIG. 7 shows a flow chart of a switching process between control units. After starting the switching process in step S11, in step S12 an inquiry is made as to whether the particular manipulators are at present moved in an automatic mode. The switching process is dependent on the operating mode. This is e.g. intended to make it possible in the automatic mode to change between control units without stopping a manipulator, e.g. in order to inspect outputs of a specific control device. The manipulators move autonomously in the automatic mode, so that a switching to another control does not lead to a control loss.

If the system is not in the automatic mode, the existing manipulator is stopped (step S13). If the installation is not in the automatic mode or a manual operation is superimposed in the automatic mode (inquiry in step S12'), it is possible for an operator to be moving and switching a manipulator during movement, so that control regarding the particular manipulator is lost, because according to the invention operating processes act on another control unit following switching. Therefore the manually moved manipulator must definitely be stopped prior to switching (step S13).

Independently of the operating mode a state of the input devices (keys) on the operating device must be set at "not depressed" prior to switching so as to prevent the installation being stopped (step S14). The depression of a key on the operating device activates the monitoring device 2.3b (Watchdog; FIG. 2). The Watchdog is deactivated if no key is now depressed on the operating device. So that the Watchdog does not respond on switching, it is initially necessary to transmit the information "no key now depressed" (step S14). Otherwise the Watchdog reacts to the switching in the same way as to a loss of the connection in the case of pending control signals. Only after the stopping of the manipulator and the resetting of the key state is it possible to close the connection to the particular manipulator (step S15) and produce a connection to another manipulator (step S16).

Figure 8:
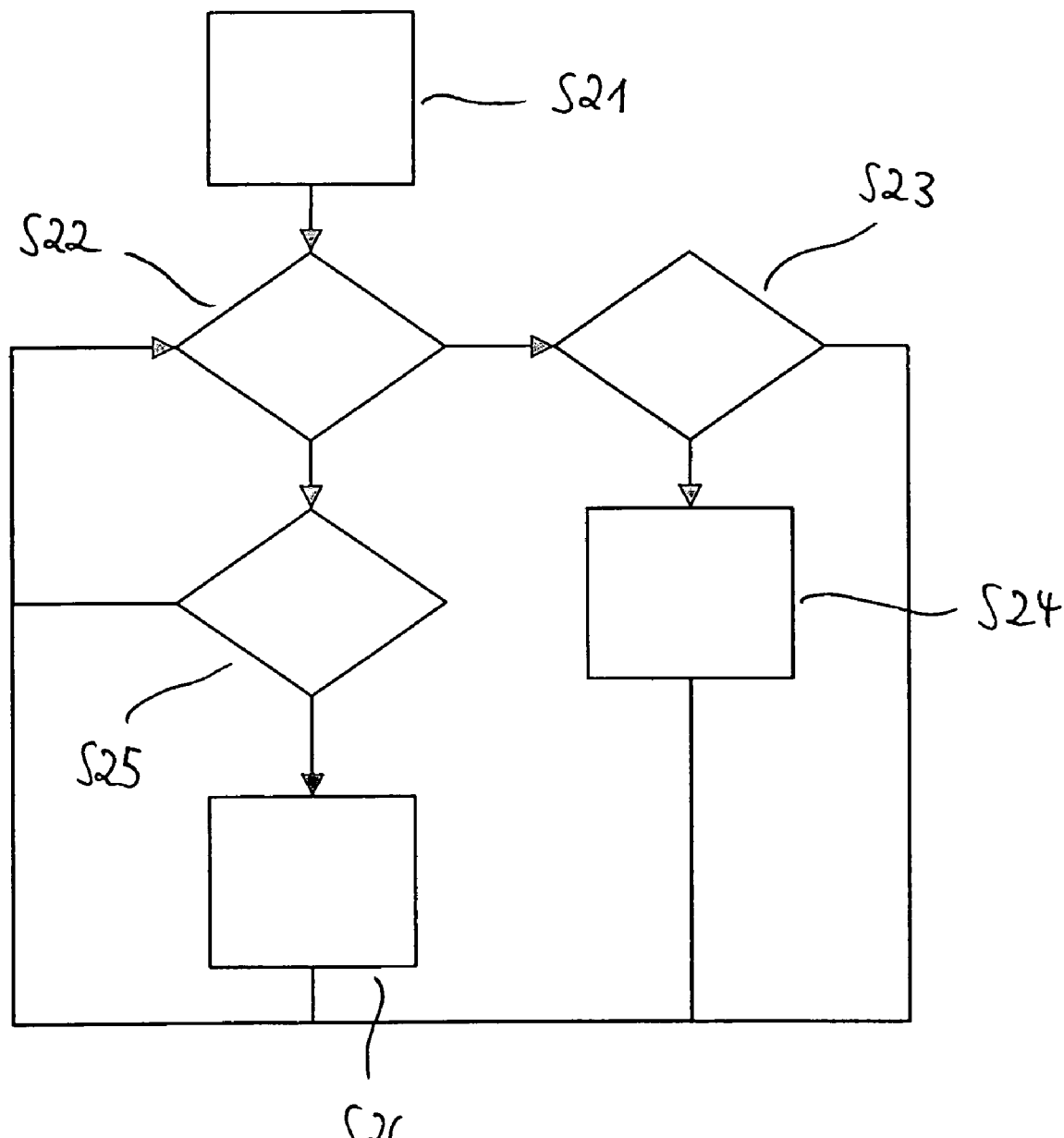
FIG. 8 A flow chart of a boot process of the control unit to which the common operating device is connected.

FIG. 8 shows a flow chart of the boot process of the control unit to which the common operating device is connected. After the particular control unit (FIGS. 1, 2 and 4: control unit 2.3) has booted the operating system (step S21), it attempts to make connections with the other control units 2.1, 2.2, 2.4. This takes place with the aid of a stored list, e.g. an address list. The control unit 2.3 processes this list in order and in step S22 checks whether a further control unit 2.1, 2.2, 2.4 can respond via the bus. If this is the case and there is no connection to such a control unit, a connection is built up and "parked" (steps S23, S24), i.e. the connection exists and no or only few data are exchanged. If the corresponding, other control unit cannot be reached via the bus, a check is made as to whether the control unit was available beforehand (step S25). In this case, in step S26, an existing, parked connection is closed and the next control in the list is checked for availability. Then the process is repeated cyclically starting with step S22.

With the aid of this method it is possible to switch on and off the control units in a random order without the operator losing the possibility of switching to a specific control unit. Also in the case of network errors the control units are quickly available again to the operator via the operating device.

Figure 9:
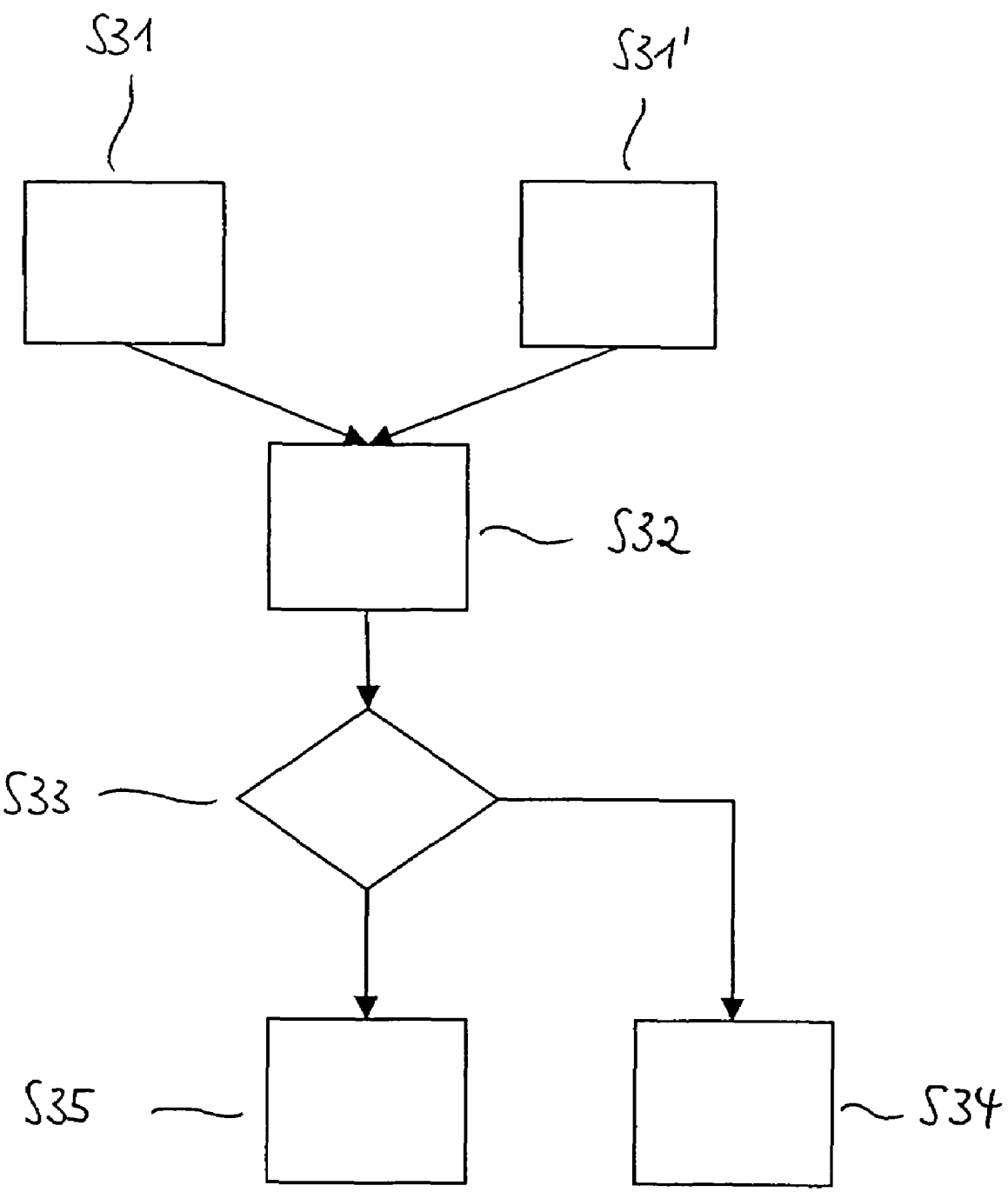
FIG. 9 A flow chart for initiating the switching process.

By means of a flow chart, FIG. 9 makes clear the initiating of a switching process when there are parked connections. They are linked with an application for displaying (visualizing) a remote operating surface BOF (cf. FIG. 2). For the remote operating surface the BOF of this application (terminal device, FIG. 2) makes available to the master control a window in the NRT area. For the window which has the focus (at the front under Windows on the desktop) and therefore seen by the operator on the master control or the operating device, the connection must be activated.

The operator has several possibilities for making the connection with another control unit: There can be a sudden or planned selection on the operating device (step S31, cf. FIGS. 5 and 6) or use can be made of a specific, conventional operating system function for switching to a specific window, e.g. depressing "Alt"+"Tab" under Windows (step S31'). As also in the latter case the switching to another control unit must function, according to the invention switching is not linked with a specific key combination, but instead with the focus on a specific window established in step S32. By means of the focussed window the master control firstly checks whether it is the display of a remote operating surface/control unit (step S33). If this is the case and this window displays another control unit to that which is at the moment displayed, then in step 35 the switching process is initiated. Otherwise (step S34) the present connection is maintained.

Figure 10:
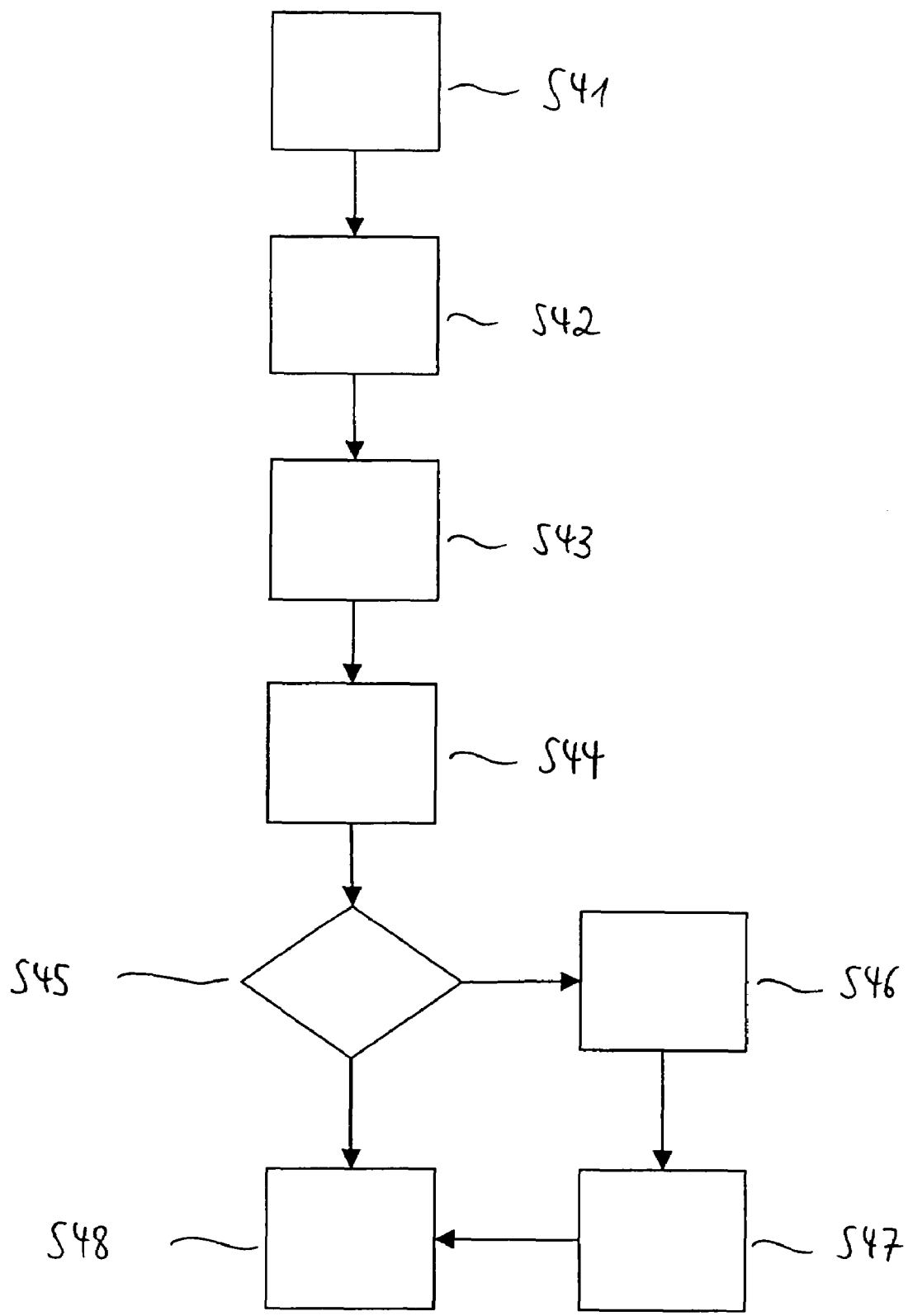
FIG. 10 A flow chart of the switching process.

FIG. 10 illustrates the sequence of the switching process, step S41 following on to the already explained step 35 (FIG. 9) and firstly a connection is made to the selected control unit. Then, by means of the non-real time data channel 31 (FIG. 4) or by means of the corresponding protocol, a connection is made to the remote control unit (step S42). If the connection can be made (step S43), an attempt is made in step S44 to produce the real time data connection (data bus 3, FIG. 4). A check is then made in step S45 as to whether both data connections end at the same remote control unit. Several methods can be considered for this purpose:

Checking by means of stored lists whether the target addresses end at the same control unit.

Transmitting a randomly selected code on one data channel, which is received by the remote station and sent back on the other data channel. If the originally transmitting control unit receives its code back on the other channel within a short time, then both data channels are connected to the same control unit.

If the data channels do not end at the same control unit, then in step S46 blocking takes place of all the movement functions (functions which are based on signals transmitted via the real time data channel) and an error message is generated via the non-real time data channel (step S47). Then and as in the case of an affirmed inquiry S45, in step S48 operation is released to enable the operator to work with the control unit.

FIGS. 11a and 11b illustrate the visualization of a remote control unit 2.1, 2.2, 2.4 (FIG. 2) by control unit 2.3 or the common operating device 6. Visualization takes place on operating device 6 or the terminal device 2.3g of master control 2.3 with the aid of a special program, e.g. Microsoft Remote Desktop. This program represents the complete screen or complete operating surface of the remote control unit and is independent of the software running on the remote device. Thus, different devices can be used, provided that they support this specific program. In principle, two procedures are possible for implementing visualization:

In FIG. 11a, for each remote control unit 2.1, 2.2 a connection $V_1$, $V_2$ is built up by means of the non-real time data bus 3' (FIG. 2) and is permanently maintained, i.e. the remote control units 2.1, 2.2 are represented as a stack of superimposed windows on the operating device 6 or 6.1 and/or on the terminal device 2.3g of control unit 2.3. This design has the advantage that the switching times are very short, because no new connections have to be formed at the switching time. However, the connections must be permanently monitored in order to detect dead connections, such as e.g. arise by the disconnection of a remote control unit 2.1, 2.2 and if necessary build them up again in the background.

FIG. 11b shows an alternative construction in which only one visualization connection V is constructed. On switching the present connection V is dismantled and a new connection V formed. However, this variant requires longer switching times, but does not need the aforementioned connection monitoring.

Figure 12:
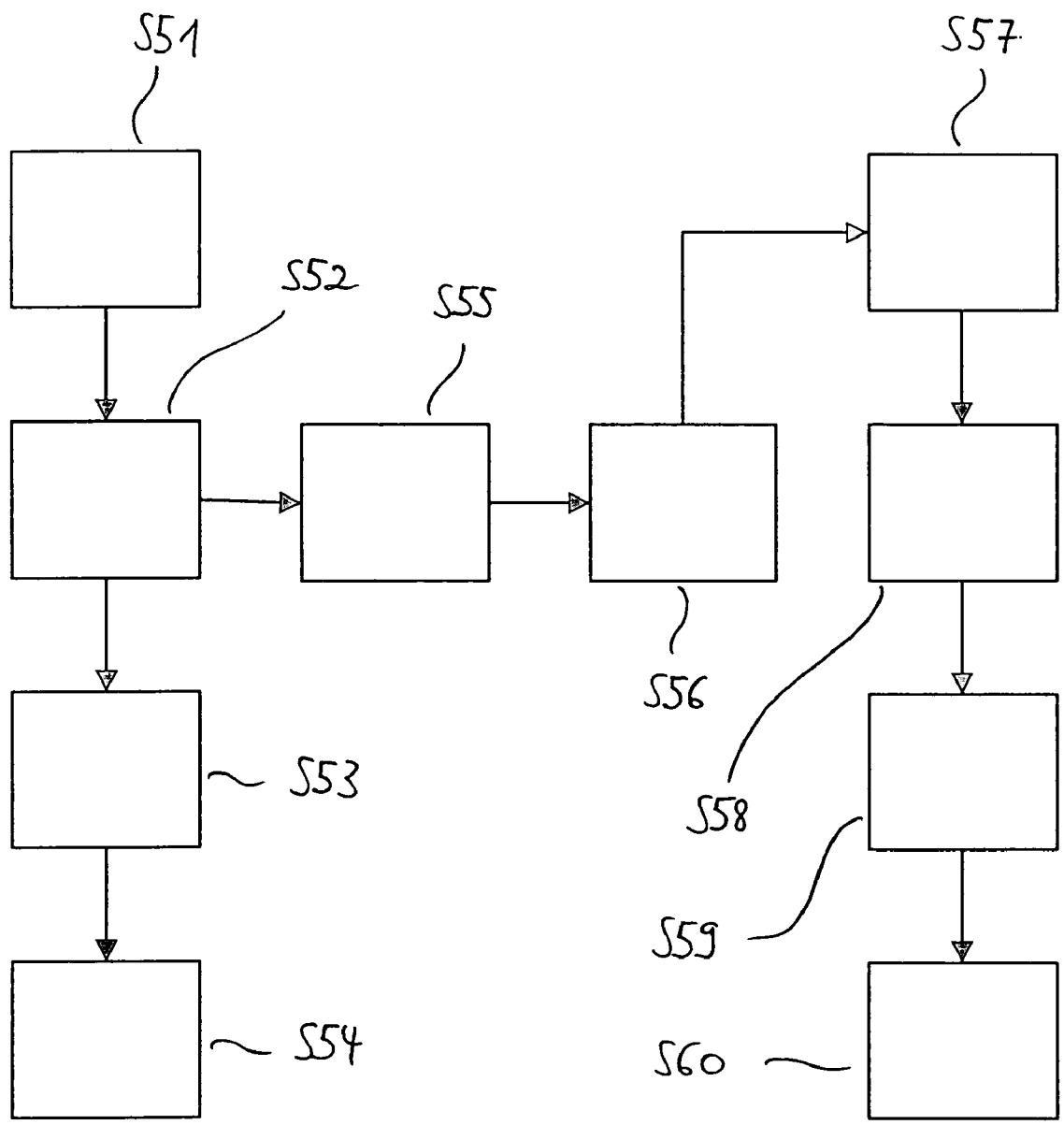
FIG. 12 A visualization flow chart.

FIG. 12 shows the processing steps taking place up to the display on the operating device 6 for the image data to be displayed. A random application, e.g. the aforementioned Microsoft Remote Desktop, transfers display instructions to a corresponding interface of the operating system, e.g. Windows in the case of the NRT area (FIG. 2) of a control unit 2.1-2.4. The display instructions can e.g. be the graphic display of a switching surface, a line, etc. The operating system prepares these commands, in that it sends detailed instructions to the graphic card driver, here e.g. the display of a small box, a background colour, an inscription, etc. The graphic card driver converts these information into pixel information and enters them in the graphic card (step S51-S54).

A plurality of available programs for representing remote computers (control units) scan situations on the graphic driver plane first (step S53), i.e. a very large number of pixel information are transmitted, which inflate the data volume and delay data transmission. In the system according to the invention the data are intercepted on the graphic interface plane of the operating system (step S52) and transmitted by Ethernet to the target system (master control 2.3) with interposed data compression and decompression steps (steps S55 and S56). This drastically reduces the data volume, because for the same transmission rate per time unit more commands are transmitted than pixel information. Pixel information transmission is only necessary for displaying images. Steps S55 and S56 permit the operation of the system using a slow modem connection.

The receiving station (terminal device 2.3g and/or operating device 6) receives the data (step S57) which are optionally transformed if e.g. the depth of colour or resolution of the transmitting and receiving system differ. The data are then displayed in the conventional manner by means of the operating system interface, graphic card driver and graphic card (steps S58-S60). It is fundamentally possible according to the invention to operate the control units without graphic cards if the visualization is completely taken over by the operating device. At least for diagnostic purposes, graphic cards are still helpful in the controls.

Figure 13A:
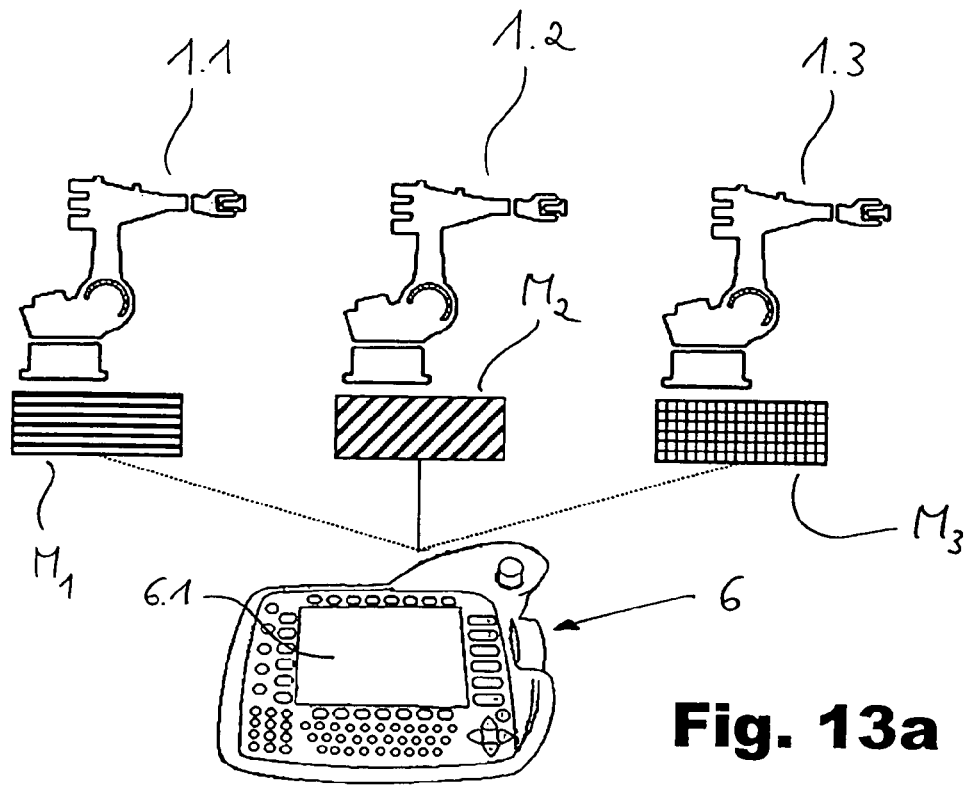
FIGS. 13a, 13b Diagrammatic representations of association possibilities between the operating device and manipulator.
Figure 13B:
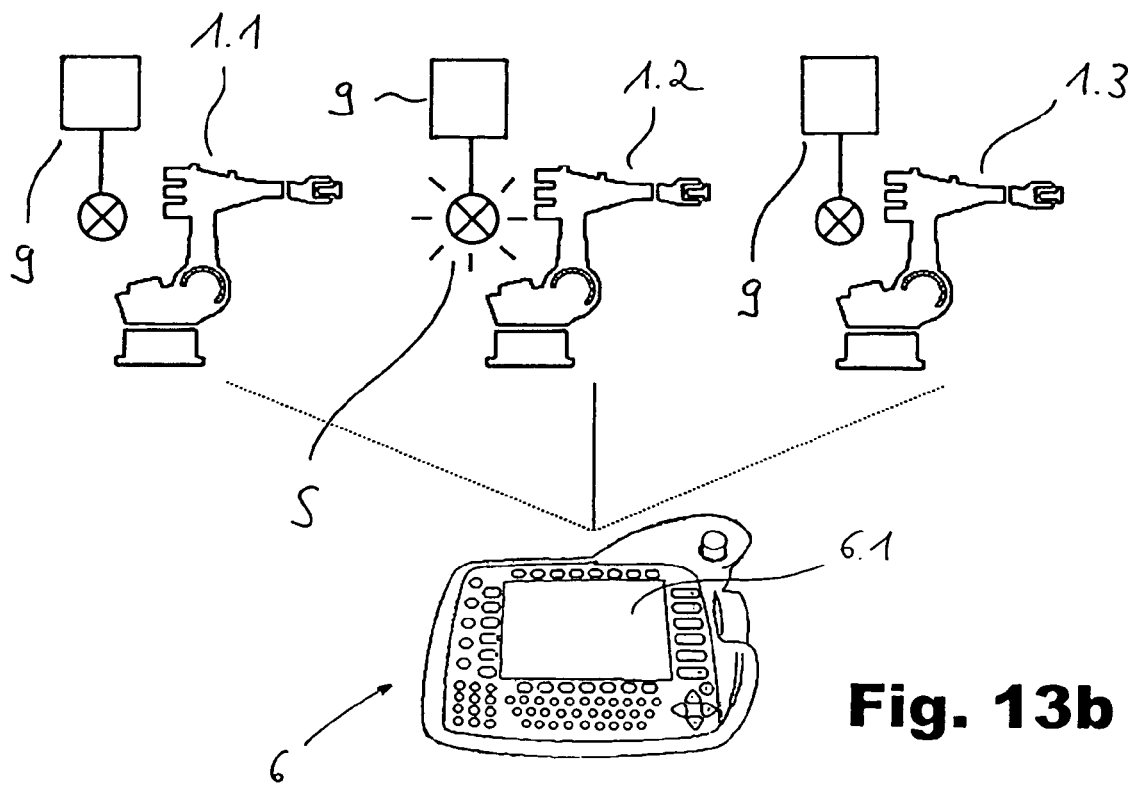

In order to allow a safe operation of several control units with a common operating device, there must be an operator clear association between the operating device and control unit or manipulator, in the manner shown in FIGS. 13a and 13b.

According to FIG. 13a each manipulator is marked in an optically effective manner, e.g. by the application of coloured strips. The operating surface, as displayed according to the invention on the common operating device 6 or on its input and display unit 6.1, reflects the marking of the manipulator with which it is instantaneously connected. This presupposes that the markings $M_1, M_2, M_3$ of the manipulators 1.1, 1.2, 1.3 are matched to the software configuration of the not shown control unit. In place of a coloured marking it is also possible to use a random symbol which is used as a background for the operating surface displayed on the operating device 6.

FIG. 13b shows another, additionally or alternatively usable identification possibility for the manipulators 1.1-1.3. Each manipulator 1.1-1.3 has a signal generator S, e.g. a lamp or a LED strip.

If the operator selects on operating device 6 a not shown control unit, then the corresponding signal generator S lights up. However, the signal generator S can also be an acoustic signal generator or a combined acoustic-optical signal generator. Such a design has the advantage that no device has to be matched to an externally applied marking, so that a faulty configuration is largely prevented.

REFERENCE NUMERALS LIST 1.1-1.4 Manipulator (robot)
2.1-2.4 Control unit
2.3 Master control
2.3a Driver
2.3b Monitoring device (Watchdog)
2.3c Path control device
2.3d Processing device
2.3e Detecting device
2.3f Queue
2.3g Terminal device
2.3i Switching device
2.3k Selecting device
2.Xa Operating device emulator
2.Xf queue
2.Xd processing device
2.Xh Reader
3, 3' Data bus (real time, non-real time)
3" Monitoring device
4 Monitoring device
5, 5' Safety bus
5.1 Node
6 Operating device
6.1 Operating/display unit
6.2 Intermediate board
6.3 Verification device
7 Data bus
8 Visualizing bus
9 Monitoring device
BOF Operating surface
$M_1, M_2, M_3$ Marking
NRT Non-real time area
P, P', P" Control changes
RT Real time area
S Signal generator
TC1, TC2 Terminal client
TS1, T52 Terminal server
V, V1, V2, V3 Visualization connection.

The invention claimed is:

1. Method for controlling a plurality of manipulators with a number of associated control units associated with the manipulators, so that each control unit controls at least one manipulator, the method comprising the steps of:
providing a portable operating device which accesses several control units for controlling the manipulators;
providing movement-relevant control signals and non-movement-relevant control signals, the movement-relevant control signals being generated by the portable operating device and being directly suitable for a motion control of the manipulators in question;
passing the movement-relevant control signals via a first transmission means in real time to an area of the associated control unit, which area is designed to process motion-relevant control signals in real time;
passing the non-movement-relevant control signals via a second transmission means to an area of the associated control unit, which area is designed for the non-real-time processing of data.

2. Method according to claim 1, wherein the manipulator linked by means of the associated control unit with the portable operating device is indicated by an optical and/or acoustic signal generator.

3. Method according to claim 2, wherein the operability of the signal generator is monitored by a monitoring device.

4. Method according to claim 1, wherein the portable operating device generates the non-movement-relevant control signals.

5. Method according to claim 4, wherein the non-movement-relevant control signals are exclusively directed to a terminal device present in the non-real time area of the associated control unit for the display of operating surfaces of different control units.

6. Method according to claim 1, wherein the transmission of movement-relevant signals via the first transmission means is controlled by a first monitoring device and in the case of an interruption of transmission a movement-relevant control signal is generated by said monitoring device.

7. Method according to claim 1, wherein the portable operating device displays the operating surface of the control unit of the selected manipulator.

8. Method according to claim 7, wherein there is a graphic display.

9. Method according to claim 8, wherein a designation of the manipulators is displayed on the portable operating device for identifying selected manipulators.

10. Method according to claim 8, wherein for identifying the selected manipulators an optically acting marking present on the particular manipulator is displayed on the portable operating device.

11. Method according to claim 8, wherein for identifying the selected manipulators, an acoustic and/or optical signal generator present on the particular manipulator is activated.

12. Method according to claim 8, wherein image contents of the control unit associated with the selected manipulators are digitally transmitted to the portable operating device.

13. Method according to claim 12, wherein image contents data are compressed prior to transmission.

14. Method according to claim 12, wherein standard image elements are transmitted as control instructions and independently displayed by the portable operating device.

15. Method according to claim 8, wherein image information is transmitted as pixel data.

16. Method according to claim 7, wherein the image information data and control signals generated by the portable operating device are transmitted through a same channel.

17. Method according to claim 7, wherein the image information data and control signals generated by the portable operating device are transmitted on different channels, a function and target of the channels being controlled by a second monitoring device.

18. A system for controlling a plurality of manipulators, the system comprising:
a plurality of control units associated with each of the manipulators, so that each control unit controls at least one manipulator, each of the control units have a real-time area set up for execution of a real-time-capable operating system and have a non-real-time area for execution of a non-real-time-capable operating system, said real-time areas of said control units being designed to process movement-relevant control signals, which are sent to the real-time-capable operating system and are directly suitable for a motion control of a respective one of the manipulators, said non-real-time areas perform non-real-time processing of non-movement-relevant control signals;
a common operating device connectable with at least one specific control unit for operating the manipulators, said common operating device being designed to operate the manipulators in real time by the movement-relevant control signals, said common operating device being further designed to generate non-movement-relevant control signals.

19. Device according to claim 18, wherein the real time areas (RT) of the control units are connected by means of a first transmitting device and the non-real time areas (NRT) of the control units are connected by means of a second transmitting device.

20. A system according to claim 18, wherein at least one control unit has in its non-real time area (NRT) a terminal device for displaying operating surfaces (BOF) of different control units.

21. A system according to claim 20, wherein further, non-movement-relevant control signals generated by the common operating device can be directed exclusively to the terminal device.

22. A system according to claim 20, wherein the real time areas (RT) of the control units are connected by means of a first transmitting device and the non-real time areas (NRT) of the control units are connected by means of a second transmitting device, all the control signals between the terminal device and an operating surface (BOF) can be communicated to the associated control unit by means of the second transmitting device.

23. A system according to claim 18, wherein at least one control unit has a detecting device for detecting a control unit controlling the selected manipulators.

24. A system according to claim 23, wherein the real time areas (RT) of the control units are connected by means of a first transmitting device and the non-real time areas (NRT) of the control units are connected by means of a second transmitting device, the control unit having the detecting device has a path control device on which action can take place through the detecting device, so that the movement-relevant control signals can be directed via the first transmitting device to the control unit associated with the selected manipulators.

25. A system according to claim 24, wherein the movement-relevant control signals can be directed to the terminal device in parallel to a transmission to the associated control unit.

26. A system according to claim 18, wherein the common operating device has a display device for displaying operating surfaces (BOF) of different control units.

27. A system according to claim 26, wherein on the common operating device is in each case displayed the operating surfaces (BOF) of the associated control unit.

28. A system according to claim 26, wherein display and control signals between the control units and the common operating device can be transmitted on a common data channel.

29. A system according to claim 26, wherein display and control signals between the control units and the common operating device can be transmitted on separate data channels.

30. A system according to claim 29, further comprising an monitoring device constructed for monitoring a function and a target of the data channels.

31. A system according to claim 26, further comprising a clear association between the displayed operating surface (BOF) and the selected manipulator.

32. A system according to claim 31, wherein the manipulators in each case have optical and/or acoustic signal generators (S), which are in each case constructed for transmitting a signal for the display of a selected manipulator.

33. A system according to claim 26, wherein the operating surface (BOF) and manipulator have substantially identical, optically acting markings ($M_1$, $M_2$, $M_3$).

34. A system according to claim 18, wherein display, control and/or safety signals can be transmitted on a bus/data channel.

35. A system according to claim 18, further comprising a safety transmitting device interconnecting the control units of all the manipulators.

36. A system according to claim 18, wherein control signals generated by the common operating device can only be directed following verification to the associated control unit.

37. A system according to claim 36, further comprising optical and/or acoustic signal generators (S) located on the manipulators and which are constructed for displaying a given link, between the common operating device and the manipulator.

38. A system according to claim 37, further comprising a monitoring device for monitoring the operability of the signal generator.

39. A method for controlling a plurality of manipulators the method comprising the steps of:
- providing a control unit for each of the plurality of manipulators, each control unit receiving control signals indicating how a respective manipulator should be controlled, each of the control units having a high priority area and a low priority area for processing the control signals, each high priority area processing the control signals with a higher priority than a respective low priority area;
- providing an operating device receiving instructions from a user;
- generating control signals at the operating device and sending the control signals to the control units of each of the plurality of manipulators;
- dividing the control signals into motion-relevant control signals, and non-motion-relevant control signals;
- sending the motion-relevant control signals to the high priority area of one of the control units;
- sending the non-motion-relevant control signals to the low priority area of one of the control units.

40. A method in accordance with claim 39, wherein:
- the high priority areas of the control units process the motion-relevant control signals in real time to control the respective manipulator;
- the low priority areas of the control units process the non-motion-relevant control signals in non-real time to control the respective manipulator.

* * * * *